(12) United States Patent
Brown

(10) Patent No.: US 10,697,730 B2
(45) Date of Patent: Jun. 30, 2020

(54) MOLDABLE HAND GRIPS FOR FIREARMS

(71) Applicant: GGC Holdings, LLC, Powder Springs, GA (US)

(72) Inventor: William E. Brown, Acworth, GA (US)

(73) Assignee: GGC HOLDINGS, LLC, Powder Springs, GA (US)

( * ) Notice: Subject to any disclaimer, the term of this patent is extended or adjusted under 35 U.S.C. 154(b) by 0 days.

(21) Appl. No.: 16/191,946

(22) Filed: Nov. 15, 2018

(65) Prior Publication Data

US 2020/0158464 A1 May 21, 2020

(51) Int. Cl.
| F41C 23/16 | (2006.01) |
| F41C 23/10 | (2006.01) |
| B25G 1/10 | (2006.01) |
| B29L 31/46 | (2006.01) |
| B29C 37/00 | (2006.01) |

(52) U.S. Cl.
CPC .............. *F41C 23/16* (2013.01); *B25G 1/102* (2013.01); *F41C 23/10* (2013.01); *B29C 37/0053* (2013.01); *B29L 2031/463* (2013.01)

(58) Field of Classification Search
None
See application file for complete search history.

(56) References Cited

U.S. PATENT DOCUMENTS

| 412,479 | A | * | 10/1889 | Davis | ..................... A63B 49/08 264/271.1 |
| 4,346,530 | A | * | 8/1982 | Stewart | ................... F41C 23/18 42/71.01 |
| 4,934,024 | A | * | 6/1990 | Sexton, I | ............... A63B 49/08 16/421 |
| 5,155,878 | A | | 10/1992 | Dellis | |
| 2001/0055994 | A1 | * | 12/2001 | Kwitek | .................. A63B 53/14 473/300 |
| 2010/0186728 | A1 | * | 7/2010 | Bednar | ................... F41B 5/123 124/25 |
| 2018/0195833 | A1 | * | 7/2018 | Bentley | .................. F41C 23/18 |

OTHER PUBLICATIONS

Gel Max and Gel Max Lip Guard fitting instructions, Shock Doctor, Inc. 2008.

* cited by examiner

*Primary Examiner* — Bret Hayes
(74) *Attorney, Agent, or Firm* — Thomas | Horstemeyer, LLP

(57) ABSTRACT

Disclosed are various embodiments of moldable hand grips for firearms. According to various embodiments, a hand grip can include a non-moldable frame and a heat-moldable grip portion disposed on the frame. The hand grip can be submerged at least partially in a water bath heated to a temperature between about 150° F. to about 212° F., resulting in the heat-moldable grip portion of the hand grip transitioning to a moldable state. After the heat-moldable grip portion of the hand grip transitions to the moldable state, the hand grip can be removed from the water bath, and the user can grab the hand grip to mold the heat-moldable grip portion to conform to his or her individual hand shape. The heat-moldable grip portion can then cool and return to a non-moldable state, resulting in a hand grip that conforms to the individual user's hand shape.

20 Claims, 5 Drawing Sheets

MOLDABLE HAND GRIPS FOR FIREARMS

BACKGROUND

Firearms, such as pistols, revolvers, rifles, and shotguns, often have hand grips that extend from the body of the firearm. The hand grip can be used to hold, carry, position, and stabilize the firearm. The conventional AR-15 rifle, for example, has what is often referred to as a "pistol grip" attached to the lower receiver of the rifle that the user can grab and use to hold and support the firearm. For some firearms, such as semiautomatic pistols, the hand grip can also serve as the structure of the firearm that receives and retains a magazine.

Hand grips for firearms are often constructed of rigid materials, such as metal, wood, or nylon-based polymers. While hand grips are often shaped by the manufacturer to generally accommodate a human hand, a hand grip may not fit comfortably or properly in an individual user's hand due to the fact that the size and shape of a hand can vary from person to person.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to moldable hand grips for firearms, such but not limited to pistols, revolvers, rifles, and shotguns. As described in further detail below, various hand grips of the present disclosure can include a non-moldable frame and a heat-moldable grip portion. The hand grip can be submerged at least partially in a water bath in which the water has been heated to a temperature sufficient to cause the heat-moldable grip portion of the hand grip to transition to a moldable state.

After the heat-moldable grip portion of the hand grip transitions to the moldable state, the hand grip can be removed from the heated water bath, and the user can grab the hand grip to mold the heat-moldable grip portion to conform to his or her individual hand shape. Thereafter, the hand grip can be allowed to cool, causing the heat-moldable grip portion of the hand grip to return to a non-moldable state, resulting in a hand grip that conforms to the shape of the individual user's hand. Accordingly, hand grips in accordance with the present disclosure can provide the ability for a user to create a hand grip that has been custom fit to his or her hand.

Figure 1:
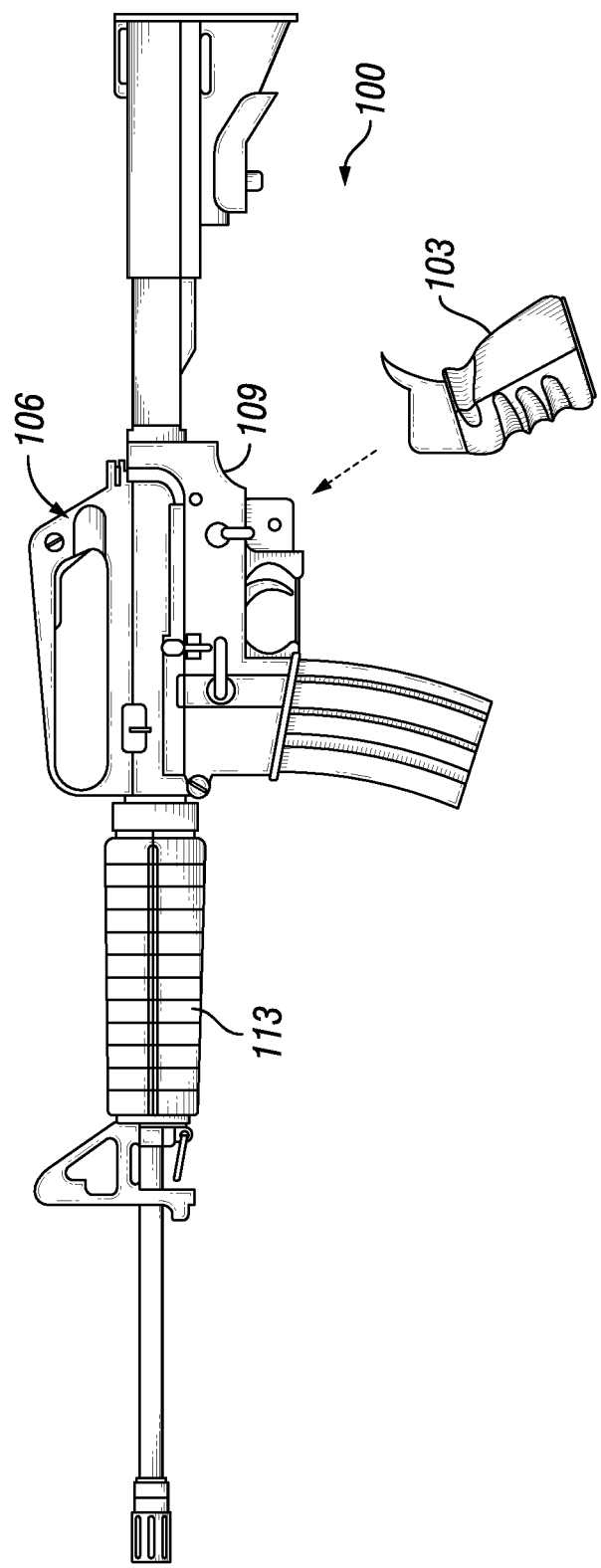
FIG. 1 shows an example of a firearm having a hand grip according to various embodiments of the present disclosure.

With reference to FIG. 1, shown is a partially-exploded view of an example of a firearm 100 having a hand grip 103 according to various embodiments of the present disclosure. In particular, FIG. 1 shows a view of the hand grip 103 separated from the body 106 of the firearm 100.

The firearm 100 shown in FIG. 1 is an example of an AR-15 style rifle. However, the firearm 100 in other embodiments of the present disclosure can be embodied in the form of various other types of firearms. For example, the firearm 100 can be embodied in the form of any type of pistol, revolver, rifle, or shotgun.

The hand grip 103 can be an appendage that extends from the body 106 of the firearm 100. The hand grip 103 can be used to hold, carry, position, and stabilize the firearm. In some embodiments, the hand grip 103 can be integrally molded with the body 106 of the firearm 100. For example, the hand grip 103 can be integrally molded with the body of a pistol. Alternatively, the hand grip 103 can be separable from the body 106 of the firearm 100, as depicted in FIG. 1.

For the embodiment shown in FIG. 1, the hand grip 103 is embodied in the form of an AR-15 pistol grip, which attaches to lower receiver 109 of the firearm 100. In alternative embodiments, the hand grip 103 can be embodied as a fore grip, for example, which can attach to a handguard 113 or other structure of the body 106 of the firearm 100. Moreover, in other embodiments, such as those in which the firearm 100 is embodied in the form of a semi-automatic pistol, the hand grip 103 can be a structure that receives and retains a magazine that stores and feeds ammunition.

Figure 2A:
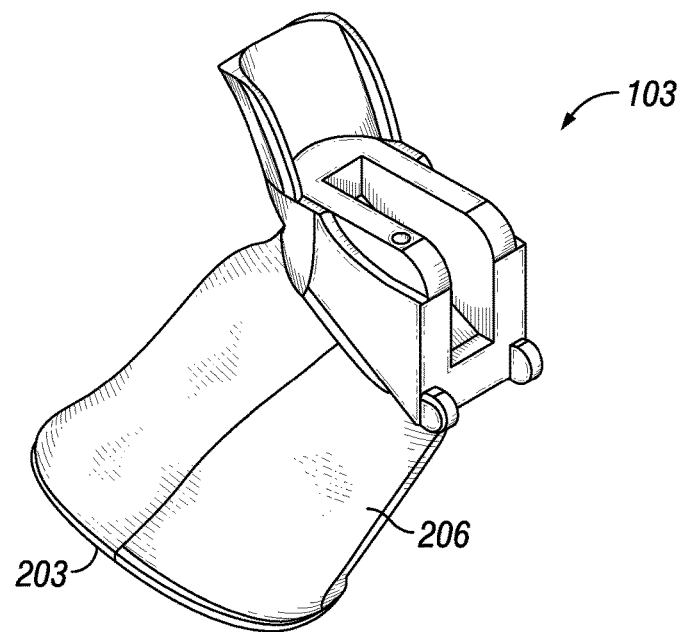
FIG. 2A shows a perspective view of the hand grip of the firearm of FIG. 1 according to various embodiments of the present disclosure.
Figure 2B:
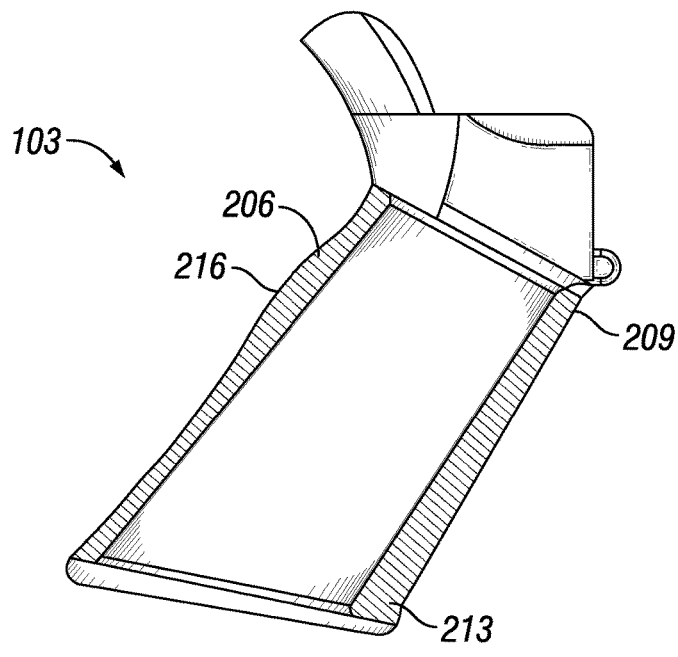
FIG. 2B shows a side cross-sectional view of the hand grip of the firearm of FIG. 1 according to various embodiments of the present disclosure.
Figure 2C:
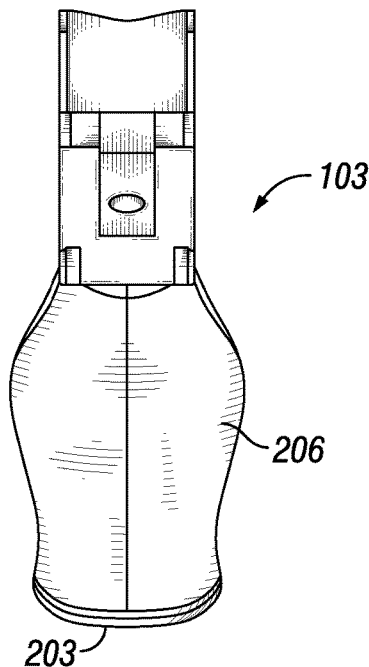
FIG. 2C shows a front view of the hand grip of the firearm of FIG. 1 according to various embodiments of the present disclosure.

With reference to FIGS. 2A-2C, shown are views of the hand grip 103 according to various embodiments of the present disclosure. In particular, FIG. 2A shows a perspective view, FIG. 2B shows a side view, and FIG. 2C shows a front view of the hand grip 103. As shown in FIGS. 2A-2C, the hand grip 103 can include a frame 203 and a heat-moldable grip portion 206.

The frame 203 can be a portion of the hand grip 103 that provides structural support and rigidity for the hand grip 103. The frame 203 can also provide a surface on which the heat-moldable grip portion 206 is disposed. According to various embodiments, the materials used for constructing the hand grip 103 can be chosen such that the shape of the frame 203 is fixed and non-moldable once the hand grip 103 has been fabricated by the manufacturer. As non-limiting examples, the frame 203 can be constructed of various types of metal, wood, plastic (e.g., a thermosetting polymer), or any other suitable material that can result in the shape of the frame 203 being non-moldable once fabricated.

As will be described in further detail below, the heat-moldable grip portion 206 of the hand grip 103 can transition into a moldable state when sufficiently heated. As such, to maintain the shape of the frame 203 while the heat-moldable grip portion 206 of the hand grip 103 is in the moldable state, the frame 203 can be constructed of a material that does not become moldable within or near the temperature range that that heat-moldable grip portion 206 becomes moldable. Accordingly, for embodiments in which the heat-moldable grip portion 206 transitions to a moldable state when submerged in a water bath heated to a temperature between about 150° F. to about 212° F., the material used for the frame 203 can be chosen such that it does not become moldable at temperatures below, for example, about 350° F.

The heat-moldable grip portion 206 can be a portion of the hand grip 103 that the user can shape to conform to his or her own individual hand. To this end, the heat-moldable grip portion 206 can be constructed of a heat-moldable material, such as a heat-moldable plastic. As previously mentioned, in some embodiments, the hand grip 103 can be at least partially submerged in a water bath heated to a temperature between about 150° F. to about 212° F. in order to cause the heat-moldable grip portion 206 to enter a moldable state. In such embodiments, the heat-moldable grip portion 206 can be constructed of a heat-moldable plastic designed to be in a moldable state when heated to a temperature between about 150° F. to about 212° F.

In some embodiments, the heat-moldable grip portion 206 can be embodied in the form of a single continuous sleeve that is disposed on and circumscribes the frame 203. In alternative embodiments, the heat-moldable grip portion 206 can comprise multiple separate segments disposed on the frame 203. In one such example, the heat-moldable grip portion 206 can comprise a front panel on the front portion of the frame 203 and separate and distinct rear panel disposed on the rear portion of the frame 203. In another example, the heat-moldable grip portion 206 can comprise multiple side panels disposed on the sides of the frame 203. Moreover, some embodiments of the heat-moldable grip portion 206 can comprise a front panel, rear panel, and side panels that are disposed on respective portions of the frame 203.

For embodiments in which the heat-moldable grip portion 206 comprises multiple segments disposed on the frame 203, the respective segments can be disposed on strategic locations of the frame 203 to facilitate a user molding the hand grip 103 to conform to his or her individual hand. For example, segments of the heat-moldable grip portion 206 can be limited to locations where the user's fingers or palm would contact the hand grip 103 when aiming the firearm 100. In embodiments in which the heat-moldable grip portion 206 comprises multiple separate and distinct segments, the frame 203 can be shaped such that it includes corresponding recessed areas in which the respective segments of the heat-moldable grip portion 206 are disposed.

In some embodiments, the heat-moldable grip portion 206 and/or frame 203 can comprise various types of physical structures, such as prongs or tabs, that can mate with corresponding receiving structures, such as receptacles or sockets, that can prevent the heat-moldable grip portion 206 from separating from the frame 203. For example, the heat-moldable grip portion 206 can include one or more prongs that insert into and are retained by corresponding receptacles in the frame 203. Similarly, the frame 203 can include one or more prongs that insert into and are retained by corresponding receptacles in the heat-moldable grip portion 206. Moreover, adhesive or fasteners can be used to prevent the heat-moldable grip portion 206 separating from the frame 203.

The thickness of the heat-moldable grip portion 206 can vary at different locations across the heat-moldable grip portion 206. For example, as shown in FIG. 2B, the thickness of the heat-moldable grip portion 206 generally increases from point 209 to point 213. Moreover, as shown in FIG. 2B, the thickness of the heat-moldable grip portion 206 at the point 216 is thicker than other locations on the rear of the hand grip 103.

In some embodiments, the heat-moldable grip portion 206 can comprise structures that improve the friction characteristics of the hand grip 103 when being held by a user. For example, the heat-moldable grip portion 206 can comprise, bumps, ridges, stippling, or other features that can improve the friction characteristics of the hand grip 103

Figure 3A:
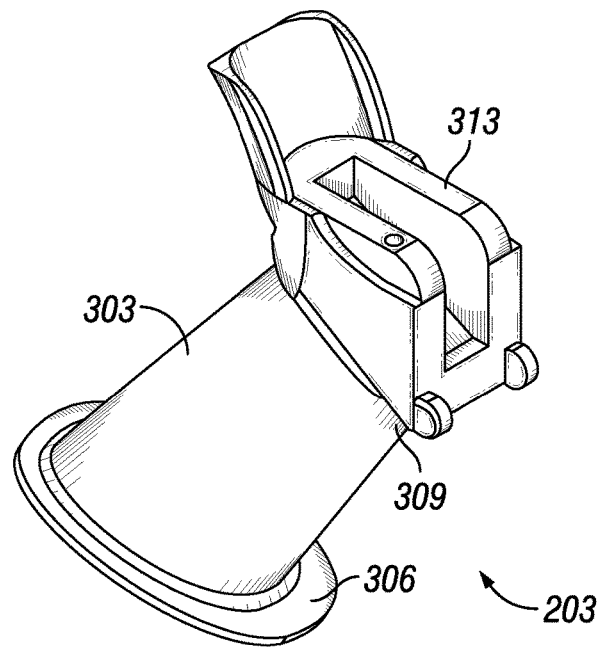
FIG. 3A shows a perspective view of the frame of the hand grip of the firearm of FIG. 1 according to various embodiments of the present disclosure.
Figure 3B:
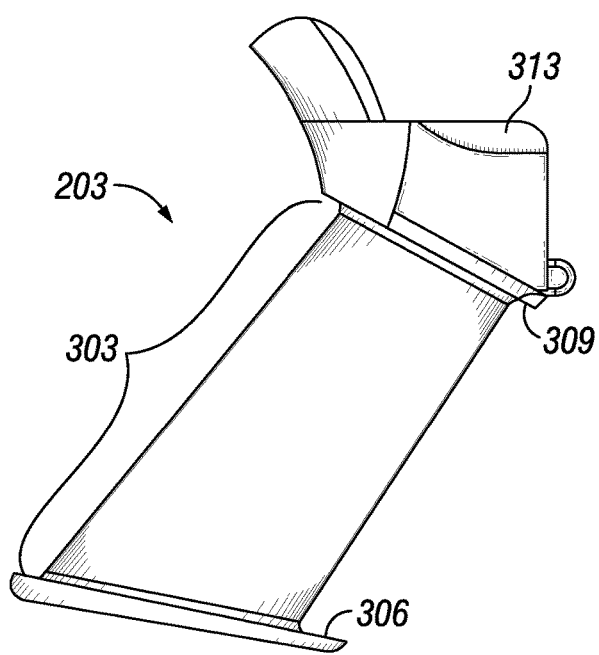
FIG. 3B shows a side view of the frame of the hand grip of the firearm of FIG. 1 according to various embodiments of the present disclosure.
Figure 3C:
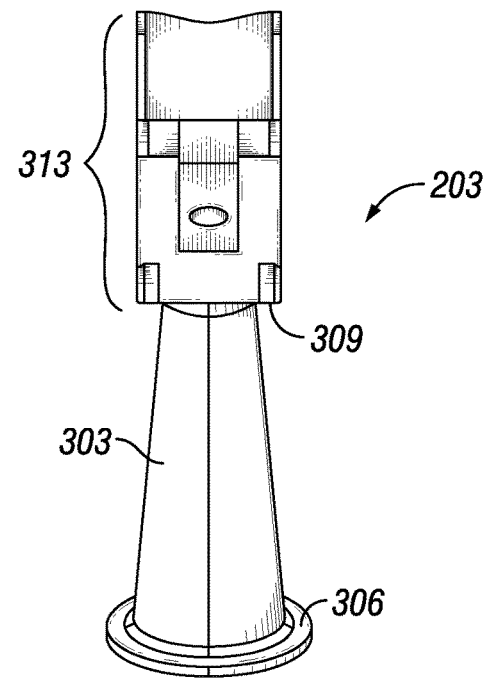
FIG. 3C shows a front view of the frame of the hand grip of the firearm of FIG. 1 according to various embodiments of the present disclosure.

With reference to FIGS. 3A-3C, shown are various views of the frame 203 according to various embodiments of the present disclosure. In particular, FIG. 3A shows a perspective view, FIG. 3B shows a side view, and FIG. 3C shows a front view of the frame 203.

The frame 203 according to various embodiments can comprise a core 303, a lower rim 306, an upper rim 309, and a lower receiver mating structure 313, as shown in FIGS. 3A-3C. The lower receiver mating structure 313 can mate with a corresponding structure of the lower receiver 109 of the firearm 100 to facilitate attachment of the hand grip 103 with the body 106 of the firearm 100.

As shown in FIGS. 3A-3C, the core can extend from the upper rim 309 to the lower rim 306. Moreover, as depicted in FIGS. 3A-3C, the core 303 can be tapered such that the width of the portion of the core 303 proximate to the lower rim 306 can be greater than the width of the portion of the core 303 proximate to the upper rim 309. For the embodiment depicted in FIGS. 3A-3C, the heat-moldable grip portion 206 can circumscribe the entire core 303 such that it is covered by the heat-moldable grip portion 206.

The upper rim 309 can protrude from the upper end of the core 303 of the frame 203, and the lower rim 306 can protrude from the lower end of the core 303 of the frame 203. When the heat-moldable grip portion 206 is disposed on the frame 203, the upper rim 309 can be adjacent to the upper end of the heat-moldable grip portion 206, and the lower rim 306 can be adjacent to the lower end of the heat-moldable grip portion 206. The upper rim 309 and lower rim 306 can function as barriers for the heat-moldable grip portion 206 when the heat-moldable grip portion 206 is being molded by a user. In this sense, the upper rim 309 and lower rim 306 can limit the extent to which the heat-moldable grip portion 206 can move when the heat-moldable grip portion 206 is in the moldable state and being molded by a user. The upper rim 309 and lower rim 306 can also maintain the heat-moldable grip portion 206 in its intended position when the hand grip 103 is in use.

Next, a description of an example of the hand grip 103 being molded by a user is provided. The following discussion assumes that the hand grip 103 is separate from the body 106 of the firearm 100. However, in alternative embodiments, such as those in which the hand grip 103 is integrally molded with a handgun, the hand grip 103 can be molded by the user while the hand grip 103 is attached to the body 106 of the firearm 100.

To begin, the user can heat a bath of water to a temperature that is sufficient to cause the heat-moldable grip portion 206 of the hand grip 103 to enter a moldable state. For embodiments in which the heat-moldable grip portion 206 is in a moldable state when its temperature is between about 150° F. to about 212° F., a user can, for example, heat a pot of water until it begins boiling and then remove the pot from the heat source.

While the water bath is at a temperature sufficient to cause the heat-moldable grip portion 206 of the hand grip 103 to transition to the moldable state, the user can at least partially submerge the hand grip 103 in the water bath. For example, a user can use the holder shown in FIGS. 6-7 or tongs to place the hand grip 103 in the water bath.

Once the hand grip 103 has been at least partially submerged in the water bath, the hand grip 103 can remain in the water bath until the temperature of the hand grip 103 has been raised to a temperature sufficient to cause the heat-moldable grip portion 206 to transition to the moldable state. For example, in one embodiment, the heat-moldable grip portion 206 can transition to the moldable state after the hand grip 103 has remained in a heated water bath having a temperature between about 150° F. to about 212° F. for about 90 seconds.

Once the heat-moldable grip portion 206 of the hand grip 103 has transitioned to a moldable state, the user can remove the hand grip 103 from the water bath and allow the hand grip 103 to cool to a temperature that allows the user to comfortably grab the hand grip 103 while high enough to maintain the heat-moldable grip portion 206 in the moldable state. For example, in some embodiments, the hand grip 103 can be lowered to a comfortable temperature by running cool tap water over the hand grip 103 for about two seconds.

Figure 4:
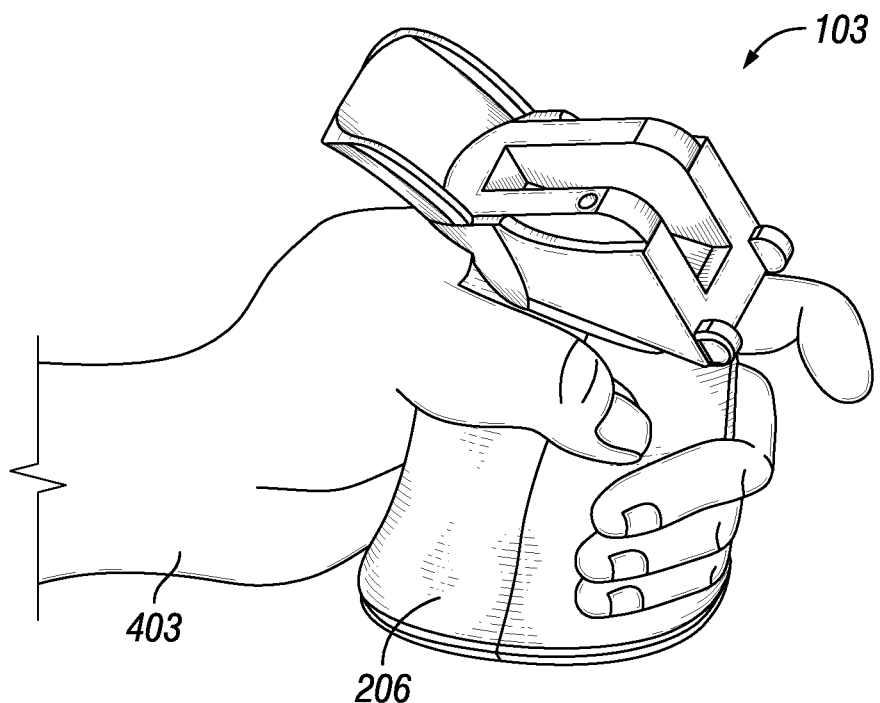
FIGS. 4-5 depict an example of a user molding the hand grip of the firearm of FIG. 1 according to various embodiments of the present disclosure.

Thereafter, the user can firmly grab and hold the hand grip 103 in a position that simulates the user holding and aiming the firearm 100. For example, FIG. 4 shows an example of a user's hand 403 grabbing and holding the hand grip 103 with the palm and fingers in a position that simulates the user holding and aiming the firearm 100. The user can maintain the position shown in FIG. 4 for a time sufficient to allow the hand grip 103 to cool to a temperature at which the heat-moldable grip portion 206 is not moldable. For example, in some embodiments, the user can grab and hold the hand grip 103 for about 20 seconds to allow the heat-moldable grip portion 206 to cool to such a temperature. After the hand grip 103 has cooled to a temperature at which the heat-moldable grip portion 206 is not moldable, the user can release the hand grip 103.

Figure 5:
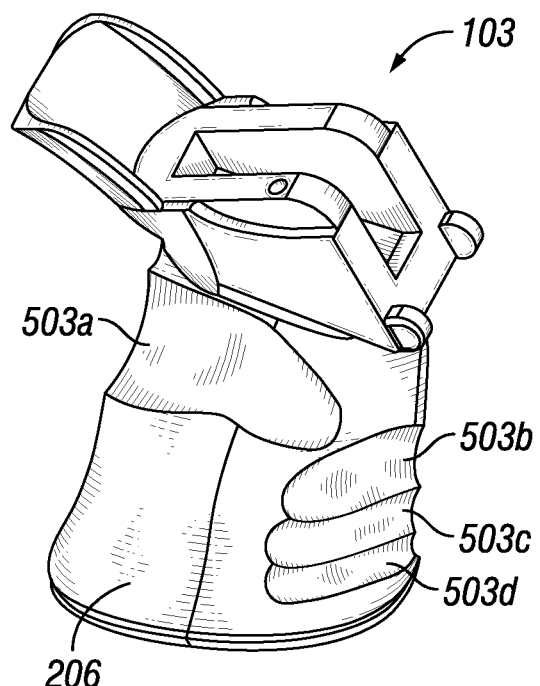

With reference to FIG. 5, shown is an example of the hand grip 103 after the user has shaped the heat-moldable grip portion 206 of the hand grip 103 using the techniques described above. As shown in FIG. 5, the user has shaped the heat-moldable grip portion 206 to create recessed areas 503a-503d so that the hand grip 103 conforms to his or her individual hand shape. Accordingly, the techniques described herein can be used to provide a hand grip 103 that a user can custom fit to his or her individual hand.

Figure 6:
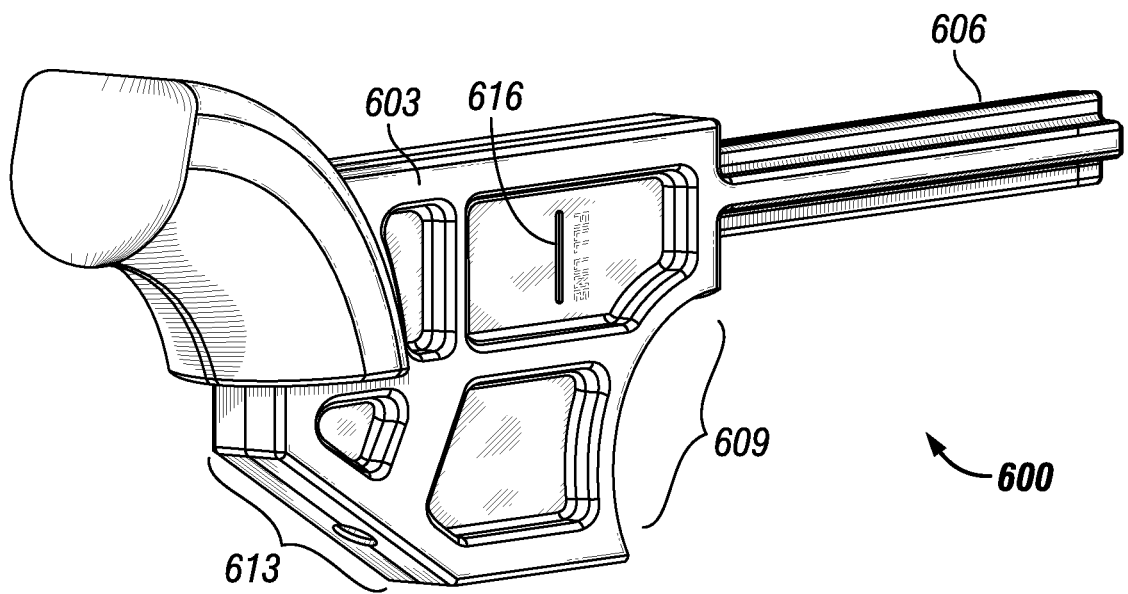
FIG. 6 depicts an example of a holder for the hand grip of the firearm of FIG. 1 according to various embodiments of the present disclosure.

With reference to FIG. 6, shown is an example of a holder 600 that can facilitate the process of shaping the heat-moldable grip portion 206 of the hand grip 103 using the techniques described above. As shown in FIG. 6, the holder 600 can include a holder body 603 and a handle 606. The handle 606 can extend from the holder body 603 and be held by a user when submerging the hand grip 103 in a heated water bath and/or removing the hand grip 103 from the heated water bath.

The holder body 603 can include a curved portion 609, a hand grip mating structure 613, and a water level indicator 616. The curved portion 609 of the holder body 609 can simulate the shape and location of the trigger of the firearm 100 when the hand grip 103 would be attached to the firearm 100. The hand grip mating structure 613 can be designed such that the lower receiver mating structure 313 of the hand grip 103 can attach to and be retained by the hand grip mating structure 613. To this end, in some embodiments, the hand grip mating structure 613 can have the same structure of the portion of the lower receiver 109 that mates with the hand grip 103.

The water level indicator 616 can be used to facilitate a user providing a sufficient amount of water in the container for the heated water bath. For example, when the holder 600 is attached to the hand grip 103, the user can place the hand grip 103 in an empty water container and add water to the container until the water level reaches the water level indicator 616. By filling the container with water to the level of the water level indicator 616, the user can ensure that sufficient water will be present in the container for the heated water bath.

The holder 600 can be constructed of a material that does not become moldable within or near the temperature range that that heat-moldable grip portion 206 of the hand grip 103 becomes moldable. In some embodiments, the holder 600 can be constructed of the same material used for the frame 203 of the hand grip 103. By using a material that does not become moldable within or near the temperature range that that heat-moldable grip portion 206 of the hand grip 103 becomes moldable, the holder 600 can maintain its shape when being used to submerge the hand grip 103 in a heated water bath.

Figure 7:
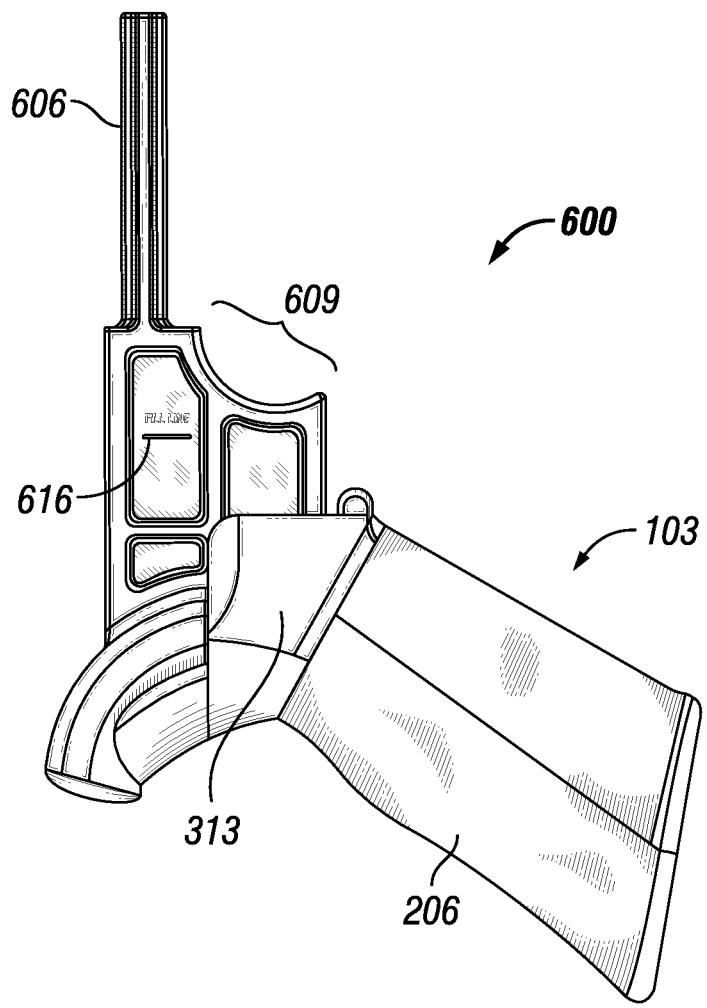
FIG. 7 depicts an example of the holder of FIG. 6 mated to the hand grip of the firearm of FIG. 1 according to various embodiments of the present disclosure.

With reference to FIG. 7, shown is the holder 600 attached to the hand grip 103. Once the holder 600 is attached to the hand grip 103, a user can grab the handle 606 of the holder 600 and submerge the hand grip 103 in a heated water bath. Once the heat-moldable grip portion 206 of the hand grip 103 transitions to the moldable state, the user can remove the hand grip 103 from the heated water bath using the handle 606. While the heat-moldable grip portion 206 is still in the moldable state, the user can grasp the hand grip 103 and mold it to the shape of his or her hand, as discussed above. Moreover, because the curved portion 609 of the holder body 609 can simulate the shape and location of the trigger of the firearm 100, the holder 600 can facilitate the user molding the hand grip 103 to a shape that is appropriate for when the user is holding the firearm 100 in a firing position.

Conditional language used herein, such as the words and phrases "can," "could," "might," "may," "e.g.," and the like, unless specifically stated or indicated otherwise, is generally intended to convey that certain embodiments include, while other embodiments do not include, certain features, elements and/or steps. Thus, such conditional language is not generally intended to imply that features, elements, and/or steps are in any way required for one or more embodiments. The terms "comprising," "including," "having," and the like are synonymous and are used inclusively, in an open-ended fashion, and do not exclude additional elements, features, acts, operations, and so forth. Also, the term "or" is used in its inclusive sense, and not in its exclusive sense, so that when used, for example, to connect a list of elements, the term "or" means one, some, or all of the elements in the list.

Disjunctive language, such as the phrase "at least one of X, Y, Z," unless indicated otherwise, is used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Numerical ranges described herein are used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure. For example, the phrase "x to y" includes the range from "x" to "y" as well as the range greater than 'x' and less than "y." The range can also be expressed as an upper limit. For example, "about x, y, z, or less" and should be interpreted to include the specific ranges of "about x," "about y," and "about z," as well as the ranges of "less than x," "less than y," and "less than z." Likewise, the phrase "about x, y, z, or greater" should be interpreted to include the specific ranges of "about x," "about y," and "about z," as well as the ranges of "greater than x," "greater than y," and "greater than z." In some embodiments, the term "about" can include traditional rounding according to significant figures of the numerical value. In addition, the phrase "about 'x' to 'y'", where 'x' and 'y' are numerical values, includes "about 'x' to about 'y'".

The above-described embodiments of the present disclosure are merely examples of implementations to provide a clear understanding of the principles of the present disclosure. Many variations and modifications can be made to the above-described embodiments without departing substantially from the spirit and principles of the disclosure. In addition, components and features described with respect to one embodiment can be included in another embodiment. All such modifications and variations are intended to be included herein within the scope of this disclosure.

Therefore, the following is claimed:

1. A firearm, comprising:
  a firearm body; and
  a hand grip extending from the firearm body, the hand grip being configured to be submerged at least partially in a heated water bath, the hand grip comprising:
    a frame that maintains an existing shape while the hand grip is submerged at least partially in the heated water bath, the frame comprising a tapered core, the frame further comprising an upper rim that protrudes from an upper end of the tapered core, the frame further comprising a lower rim that protrudes from a lower end of the tapered core, the lower rim of the frame comprising an upper surface and a lower surface; and
    a heat-moldable grip portion disposed on the frame such that the heat-moldable grip portion circumscribes the tapered core of the frame of the hand grip, the heat-moldable grip portion comprising a first end that abuts the upper rim of the frame, the heat-moldable grip portion further comprising a second end that abuts and opposes the upper surface of the lower rim of the frame, the upper surface of the lower rim of the frame being configured to form a barrier that prevents the second end of the heat-moldable grip portion from extending past the upper surface of the lower rim, the heat-moldable grip portion being configured to transition to a moldable state in response to the hand grip being submerged at least partially in the heated water bath.

2. The firearm of claim 1, wherein the frame comprises a mating structure that attaches to the firearm body.

3. The firearm of claim 1, wherein the heated water bath is heated to a temperature between about 150° F. to about 212° F.

4. The firearm of claim 1, wherein the frame of the hand grip comprises a polymeric plastic.

5. The firearm of claim 1, wherein the heat-moldable grip portion is a continuous sleeve.

6. The firearm of claim 1, wherein the heat-moldable grip portion is a plurality of separate segments.

7. The firearm of claim 1, wherein the frame comprises means for preventing the heat-moldable grip portion from separating from the frame.

8. The firearm of claim 1, wherein the heat-moldable grip portion comprises means for preventing the heat-moldable grip portion from separating from the frame.

9. An apparatus, comprising:
  a hand grip for a firearm, the hand grip being configured to be submerged at least partially in a heated water bath, the hand grip comprising:
    a frame that maintains an existing shape when the hand grip is submerged at least partially in the heated water bath, the frame comprising a tapered core, the frame further comprising an upper rim that protrudes from an upper end of the tapered core, the frame further comprising a lower rim that protrudes from a lower end of the tapered core, the lower rim of the frame comprising an upper surface and a lower surface; and
    a heat-moldable grip portion disposed on the frame such that the heat-moldable grip portion circumscribes the tapered core of the frame of the hand grip, the heat-moldable grip portion further comprising a second end that abuts and opposes the upper surface of the lower rim of the frame, the upper surface of the lower rim of the frame being configured to form a barrier that prevents the second end of the heat-moldable grip portion from extending past the upper surface of the lower rim, the heat-moldable grip portion being configured to transition to a moldable state in response to the hand grip being submerged at least partially in the heated water bath.

10. The apparatus of claim 9, wherein the frame comprises a mating structure that attaches to a body of the firearm.

11. The apparatus of claim 9, wherein the heated water bath is heated to a temperature between about 150° F. to about 212° F.

12. The apparatus of claim 9, wherein the frame of the hand grip comprises a polymeric plastic.

13. The apparatus of claim 9, wherein the heat-moldable grip portion is a continuous sleeve.

14. The apparatus of claim 9, wherein the heat-moldable grip portion is a plurality of separate segments.

15. The apparatus of claim 9, wherein the frame comprises means for preventing the heat-moldable grip portion from separating from the frame.

16. The apparatus of claim 9, wherein the heat-moldable grip portion comprises means for preventing the heat-moldable grip portion from separating from the frame.

17. A method, comprising:
  heating a water bath;
  submerging at least a portion of a hand grip for a firearm in the water bath, the hand grip comprising:
    a frame comprising a tapered core, the frame further comprising an upper rim that protrudes from an upper end of the tapered core, the frame further comprising a lower rim that protrudes from a lower end of the tapered core, the lower rim of the frame comprising an upper surface and a lower surface; and a heat-moldable outer grip portion disposed on the frame such that the heat-moldable outer grip portion circumscribes the tapered core of the frame of the hand grip, the heat-moldable grip portion comprising a first end that abuts the upper rim of the frame, the heat-moldable grip portion further comprising a second end that abuts and opposes the upper surface of the lower rim of the frame, the upper surface of the lower rim of the frame being configured to form a barrier that prevents the second end of the heat-moldable grip portion from extending past the upper surface of the lower rim;

removing the hand grip from the water bath after the heat-moldable grip portion of the hand grip transitions to a moldable state;

after removing the hand grip from the water bath, molding the heat-moldable grip portion to conform to at least a portion of a human hand while maintaining an existing shape of the frame; and cooling the hand grip so that the heat-moldable grip portion transitions to a non-moldable state.

18. The method of claim 17, wherein molding the heat-moldable grip portion to conform to at least a portion of the human hand comprises grabbing the hand grip with the human hand.

19. The method of claim 17, wherein heating the water bath comprises heating the water bath to a temperature between about 150° F. to about 212° F.

20. The method of claim 17, wherein heating the water bath comprises heating the water bath until water in the water bath becomes boiling.

* * * * *